(12) United States Patent
Stall

(10) Patent No.: US 8,095,917 B2
(45) Date of Patent: Jan. 10, 2012

(54) DEBUGGER FOR VIRTUAL INTERMEDIATE LANGUAGE OPERATIONS

(75) Inventor: Jonathon Michael Stall, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 1120 days.

(21) Appl. No.: 11/810,073

(22) Filed: Jun. 4, 2007

(65) Prior Publication Data
US 2008/0301649 A1   Dec. 4, 2008

(51) Int. Cl.
G06F 9/44 (2006.01)
(52) U.S. Cl. ...................................... 717/130
(58) Field of Classification Search .................. 717/124, 717/130, 131, 146
See application file for complete search history.

(56) References Cited

U.S. PATENT DOCUMENTS

| | | | |
|---|---|---|---|
| 5,794,068 A | 8/1998 | Asghar et al. | |
| 5,983,337 A | 11/1999 | Mahalingaiah et al. | |
| 6,164,841 A | 12/2000 | Mattson, Jr. et al. | |
| 6,317,873 B1 | 11/2001 | Townsend | |
| 6,430,741 B1 | 8/2002 | Mattson, Jr. et al. | |
| 6,484,312 B1 | 11/2002 | Morrison | |
| 6,574,727 B1 | 6/2003 | Davidson et al. | |
| 6,662,294 B1 | 12/2003 | Kahle et al. | |
| 7,111,278 B1 | 9/2006 | Siska, Jr. | |
| 7,181,596 B2 | 2/2007 | Henry et al. | |
| 2003/0023958 A1* | 1/2003 | Patel et al. | 717/146 |
| 2003/0037225 A1 | 2/2003 | Deng et al. | |
| 2003/0154468 A1* | 8/2003 | Gordon et al. | 717/143 |
| 2005/0028137 A1* | 2/2005 | Evans et al. | 717/110 |
| 2006/0080647 A1* | 4/2006 | Bhansali et al. | 717/148 |

OTHER PUBLICATIONS

"Code Virtualizer", Date: 2007, http://www.oreans.com/codevirtualizer.php.

Vassiliadis, et al., "Enhancing a Reconfigurable Instruction Set Processor with Partial Predication and Virtual Opcode Support", Department of Physics, Aristotle University of Thessaloniki, 2006, 12 pages.

* cited by examiner

Primary Examiner — Anna Deng

(57) ABSTRACT

Various technologies and techniques are disclosed for testing intermediate language operations. A debugger harness is provided that instruments an intermediate language stream to replace intermediate language operations with equivalent virtual intermediate language operations. A particular intermediate language operation is intercepted from the intermediate language stream and the equivalent virtual intermediate language operation is determined. The virtual machine runs under a debugger harness so that one or more managed applications are executed using the equivalent virtual intermediate language operations. This allows a functionality of the debugger to be tested.

15 Claims, 8 Drawing Sheets

DEBUGGER FOR VIRTUAL INTERMEDIATE LANGUAGE OPERATIONS

BACKGROUND

Software developers can develop software by writing source code in one or more programming languages. Some software development platforms compile the source code into an intermediate language (IL) instead of platform or processor-specific object code. This IL code is then executed in any environment that supports the particular runtime framework for that platform. A just-in-time (JIT) compilation process is used to turn the byte-code into code immediately executable by the CPU. The conversion can be performed gradually during the program's execution. JIT compilation provides environment-specific optimization, runtime type safety, and component verification. Examples of platforms that use such IL and JIT techniques include the MICROSOFT® .NET Framework, Java Virtual Machine, and others. Applications that run on such platforms that use IL and JIT compilation are typically called "managed applications".

There are various ways to test and/or debug a software application that is in development in these JIT environments, and in other environments for that matter. As a few examples, a debugger application can be used to step through a specific code path to trace a specific problem, an automated test tool can be used to run the software application with some pre-defined parameters and then log the results, and a human tester can personally go through a series of test cases to ensure an expected outcome is achieved. One problem with these testing approaches is that they are limited to the creativity of the user who debugged the program, created the automated test script, or interactively tested the application.

SUMMARY

Various technologies and techniques are disclosed for testing intermediate language operations. A debugger harness is provided that instruments an intermediate language stream to replace intermediate language operations with equivalent virtual intermediate language operations. The intermediate language operations are provided by a virtual machine. In one implementation, the virtual intermediate language operations are provided in a debugging services application programming interface. A particular intermediate language operation is intercepted from the intermediate language stream and an equivalent virtual intermediate language operation is determined. The virtual machine runs under the debugger harness so that one or more managed applications are executed using the equivalent virtual intermediate language operations. Running the managed applications while the debugger runs with the debugger harness allows functionality of the debugging services to be tested.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
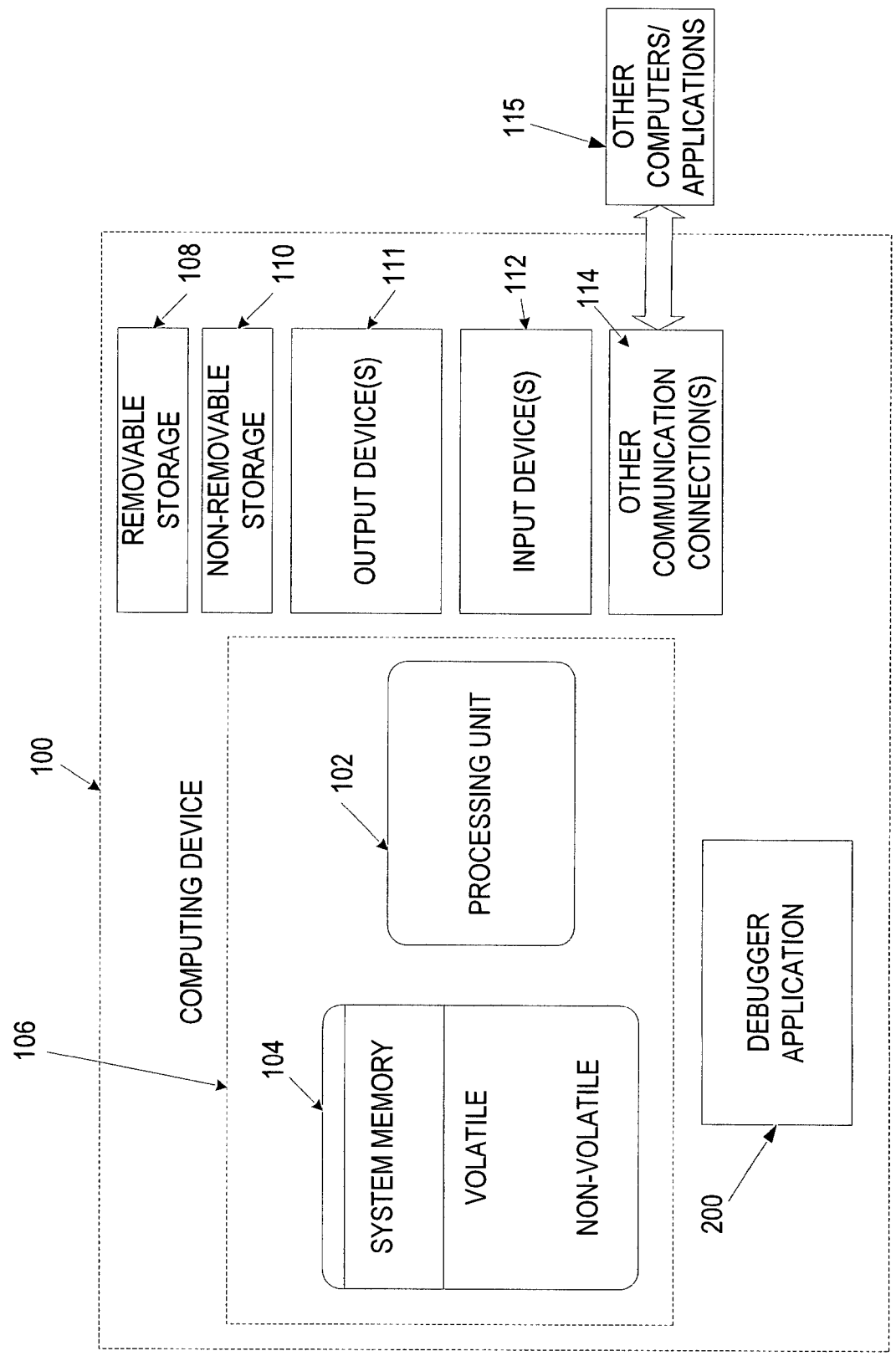
FIG. 1 is a diagrammatic view of a computer system of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as an application that provides debugging services, but the system also serves other purposes in addition to these. In one implementation, one or more of the techniques described herein can be implemented as features within a debugging program, or from any other type of program or service that allows for testing of particular application functionality. In another implementation, one or more of the techniques described herein are implemented as features with other applications that deal with platforms for executing software applications, such as the MICROSOFT® .NET Framework or Java Virtual Machine.

In one implementation, a debugger application is provided that uses a debugger harness to take pre-existing managed applications that run in a just-in-time framework and instrument the real intermediate language (IL) operations (called opcodes in some environments) with virtual intermediate language operations. The term virtual intermediate language operation as used herein is meant to include commands or other mechanisms that use a debugger harness to manipulate the virtual machine state in a same or similar way as the intermediate language operation would. In other words, as these managed applications execute, the debugger application is running in the background, and various IL operations are passed to the IL stack from the managed applications. These operations are then intercepted by the debugger harness and replaced with operations in the debugger API that are equivalent (i.e. that have the same or sufficiently similar functionality). The term "debugger harness" as used herein is meant to include a specialized debugger application and the debuggee modules (helper modules) that cooperate with it. The user who is running the particular managed application(s) has no idea that some of the underlying functionality is being provided by the debugger API as opposed to the virtual machine. By allowing these IL operations to be replaced with the equivalent debugger IL operations, the functionality of the debugger API can itself be tested more thoroughly before shipping it to end customers, such as software developers. If the managed applications do not behave as expected when using the debugger APIs, then the developers of the debugger can make further enhancements to fix any problems with the debugger.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes debugger application 200. Debugger application 200 will be described in further detail in FIG. 2.

Figure 2:
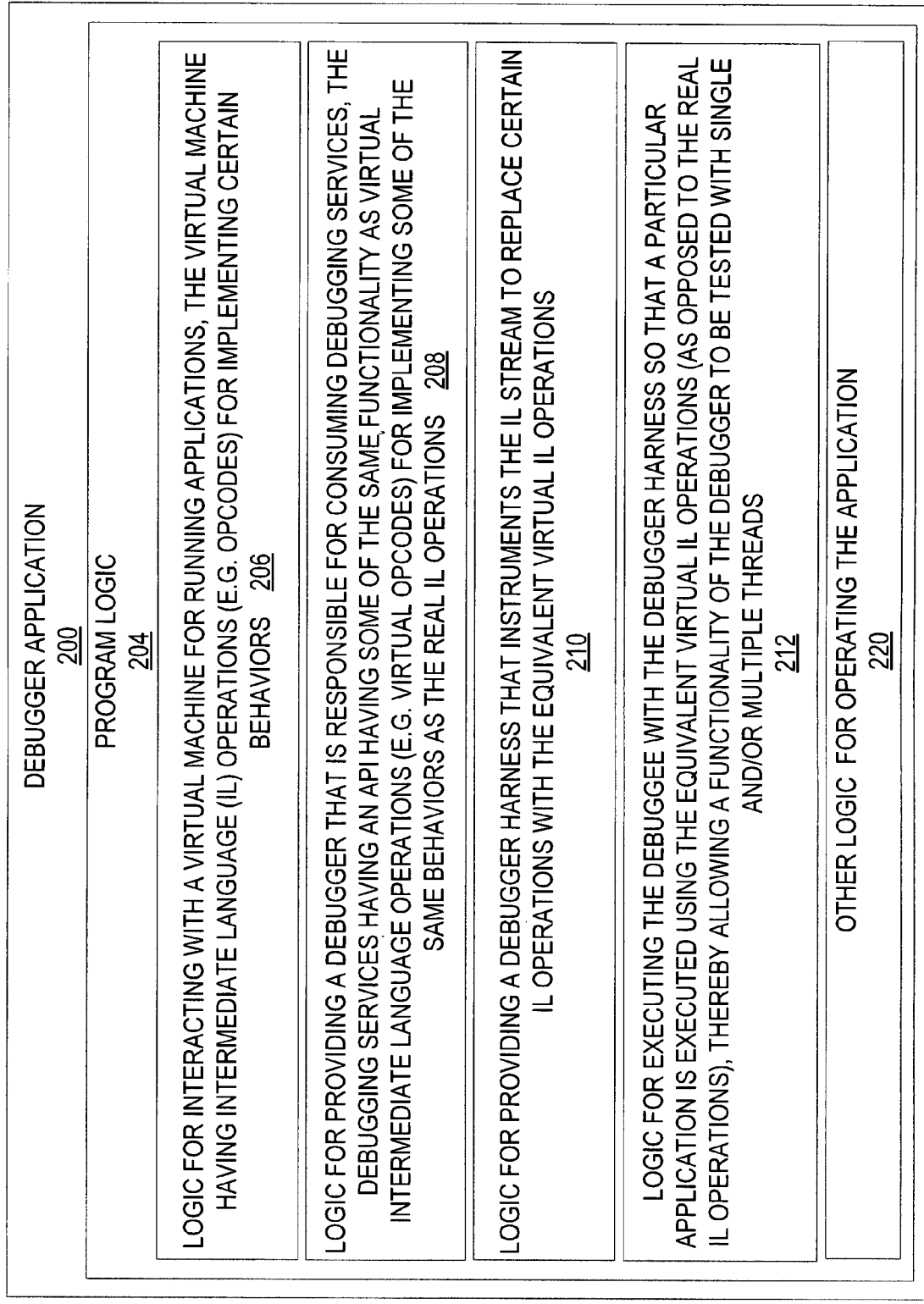
FIG. 2 is a diagrammatic view of a debugger application of one implementation operating on the computer system of FIG. 1.

Turning now to FIG. 2 with continued reference to FIG. 1, a debugger application 200 operating on computing device 100 is illustrated. Debugger application 200 is one of the application programs that reside on computing device 100. However, it will be understood that debugger application 200 can alternatively or additionally be embodied as computer-executable instructions on one or more computers and/or in different variations than shown on FIG. 1. Alternatively or additionally, one or more parts of debugger application 200 can be part of system memory 104, on other computers and/or applications 115, or other such variations as would occur to one in the computer software art.

Debugger application 200 includes program logic 204, which is responsible for carrying out some or all of the techniques described herein. Program logic 204 includes logic for interacting with a virtual machine for running applications, the virtual machine having intermediate language (IL) operations (e.g. opcodes) for implementing certain behaviors 206; logic for providing a debugger that is responsible for consuming debugging services, the debugging services having an API having some of the same functionality as virtual intermediate language operations (e.g. virtual opcodes) for implementing some of the same behaviors as the real IL operations 208; logic for providing a debugger harness that instruments the IL stream to replace certain IL operations with the equivalent virtual IL operations 210; logic for executing the debuggee with the debugger harness so that a particular application is executed using the equivalent virtual IL operations (as opposed to the real IL operations), thereby allowing a functionality of the debugger to be tested with single and/or multiple threads 212; and other logic for operating the application 220. In one implementation, program logic 204 is operable to be called programmatically from another program, such as using a single call to a procedure in program logic 204.

Figure 3:
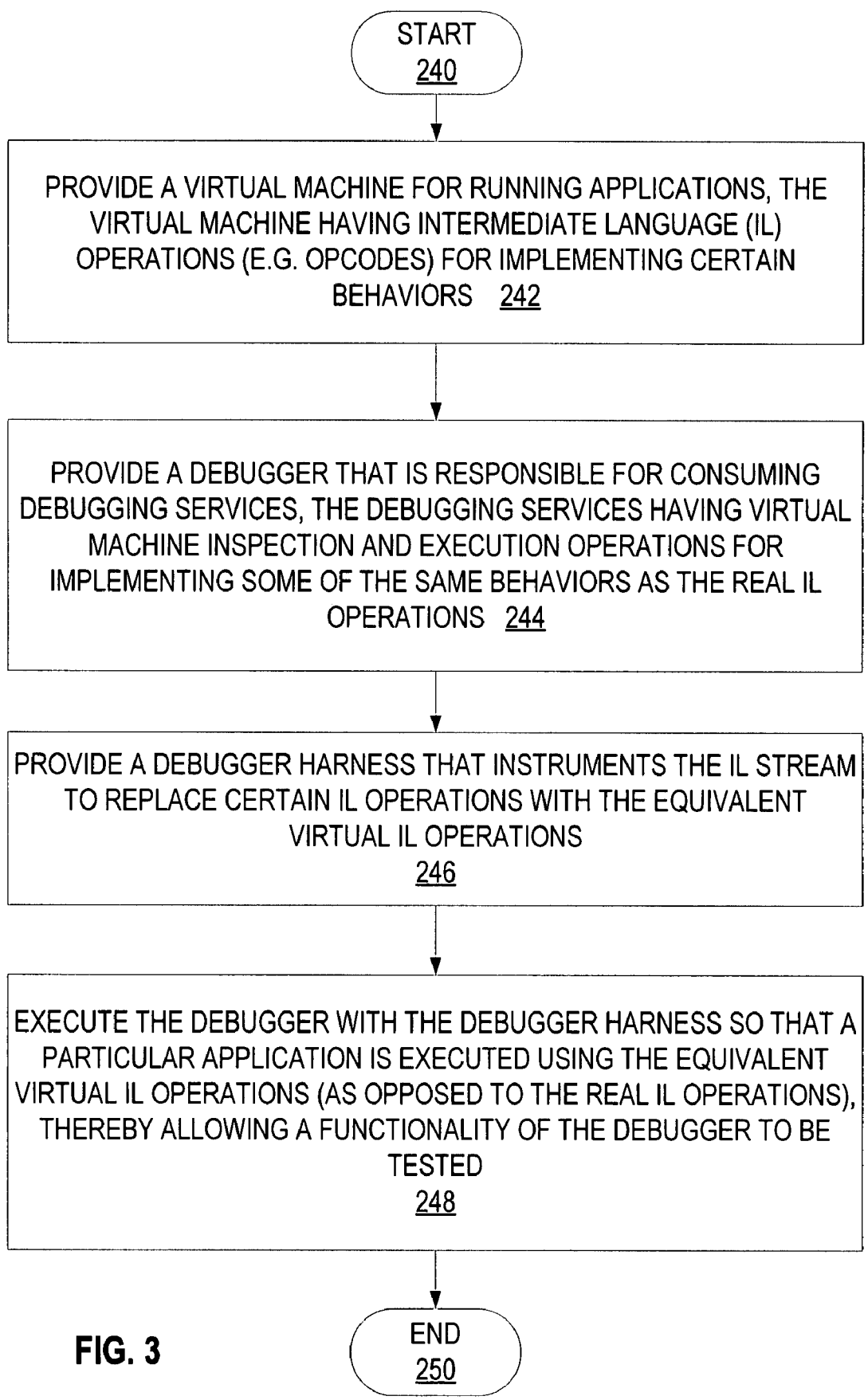
FIG. 3 is a high-level process flow diagram for one implementation of the system of FIG. 1.

Turning now to FIGS. 3-8 with continued reference to FIGS. 1-2, the stages for implementing one or more implementations of debugger application 200 are described in further detail. FIG. 3 is a high level process flow diagram for debugger application 200. In one form, the process of FIG. 3 is at least partially implemented in the operating logic of computing device 100. The process begins at start point 240 with providing a virtual machine for running applications, the virtual machine having intermediate language (IL) operations for implementing certain behaviors (stage 242). The system provides a debugger that is responsible for consuming debugging services, the debugging services having virtual machine inspection and execution operations for implementing some of the same behaviors as the real IL operations (stage 244). The system provides a debugger harness that instruments the IL stream to replace certain IL operations with the equivalent virtual IL operations (stage 246). The debugger runs with the debugger harness so that one or more applications can be executed using the equivalent virtual IL operations (as opposed to the real IL operations), thereby allowing a functionality of the debugger to be tested as the applications run (stage 248). The process ends at end point 250.

Figure 4:
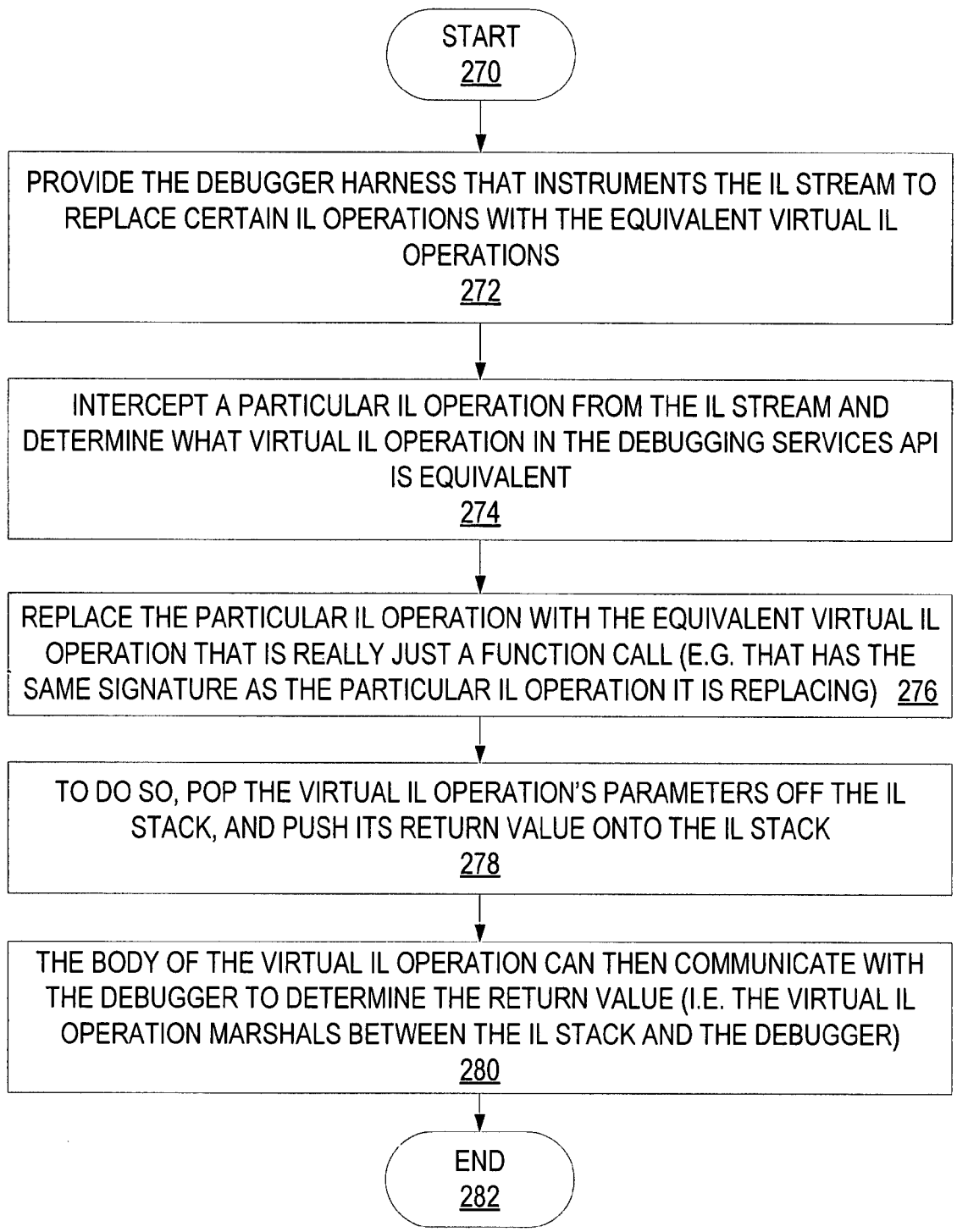
FIG. 4 is a process flow diagram for one implementation of the system of FIG. 1 illustrating the stages involved in connecting the debugging API to the intermediate language execution stack.

FIG. 4 illustrates one implementation of the stages involved in connecting the debugging API to the intermediate language execution stack. In one form, the process of FIG. 4 is at least partially implemented in the operating logic of computing device 100. The process begins at start point 270 with providing the debugger harness that instruments the IL stream to replace certain IL operations with the equivalent virtual IL operations (stage 272). The system intercepts a particular IL operation from the IL stream and determines what virtual IL operation in the debugging services API is equivalent (stage 274). The system replaces the particular IL operation with the equivalent virtual IL operation that is really just a function call (e.g. that has the same signature as the particular IL operation it is replacing) (stage 276). To do so, the system pops the virtual IL operation's parameters off the IL stack, and pushes its return value onto the IL stack (stage 278). The body of the virtual IL operation can then communicate with the debugger to determine the return value (i.e. the virtual IL operation marshals between the IL stack and the debugger) (stage 280). The process ends at end point 282.

Figure 5:
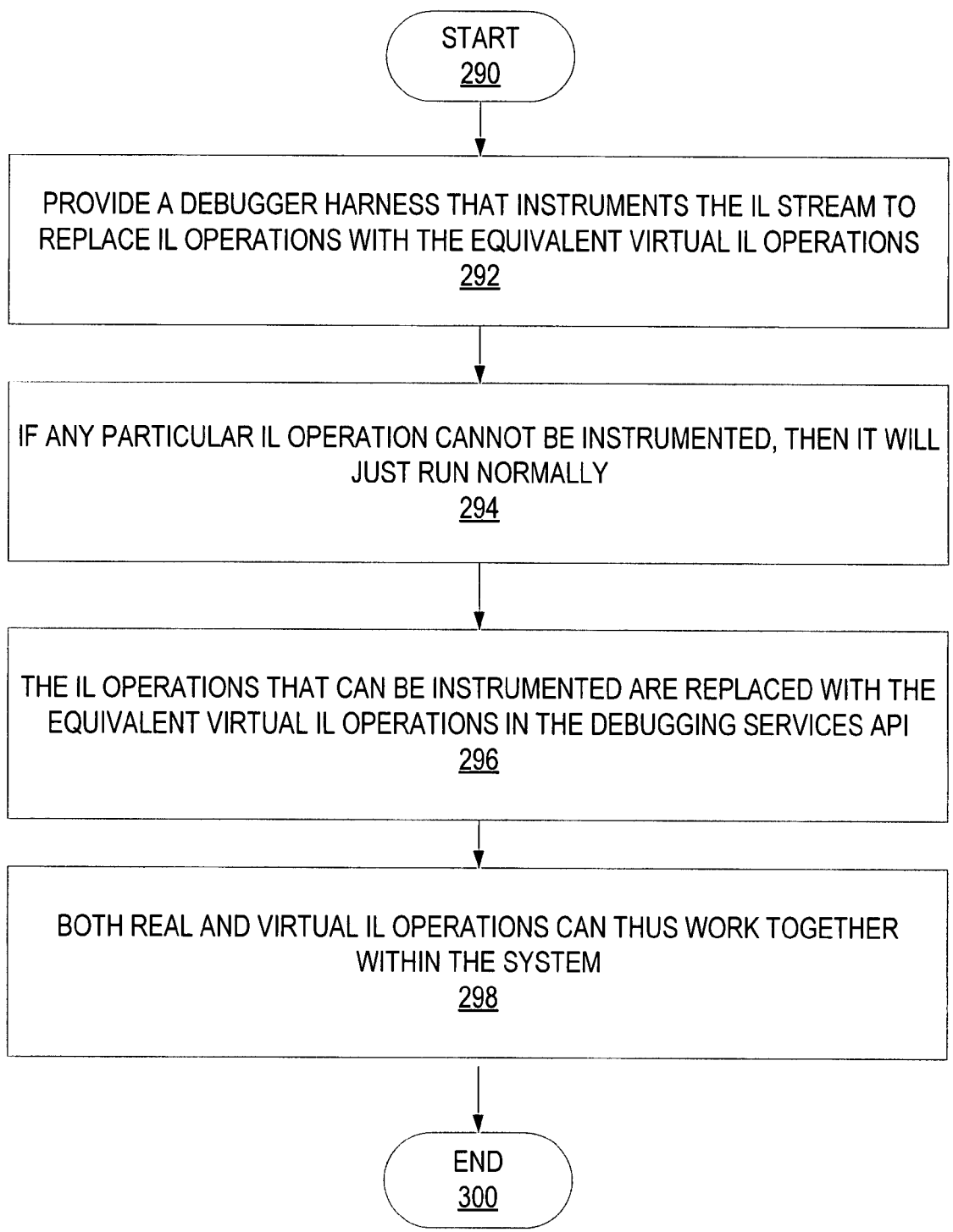
FIG. 5 is a process flow diagram for one implementation of the system of FIG. 1 illustrating the stages involved in providing partial instrumentation with the debugger harness.

FIG. 5 illustrates one implementation of the stages involved in providing partial instrumentation with the debugger harness. In one form, the process of FIG. 5 is at least partially implemented in the operating logic of computing device 100. The process begins at start point 290 with providing a debugger harness that instruments the IL stream to replace IL operations with the equivalent virtual IL operations (stage 292). If any particular IL operations cannot be instrumented, then the real IL operations will just be run normally (stage 294). The IL operations that can be instrumented are replaced with the equivalent virtual IL operations in the debugging services API (stage 296). Both real and virtual IL operations can thus work together within the system (stage 298). The process ends at end point 300.

Figure 6:
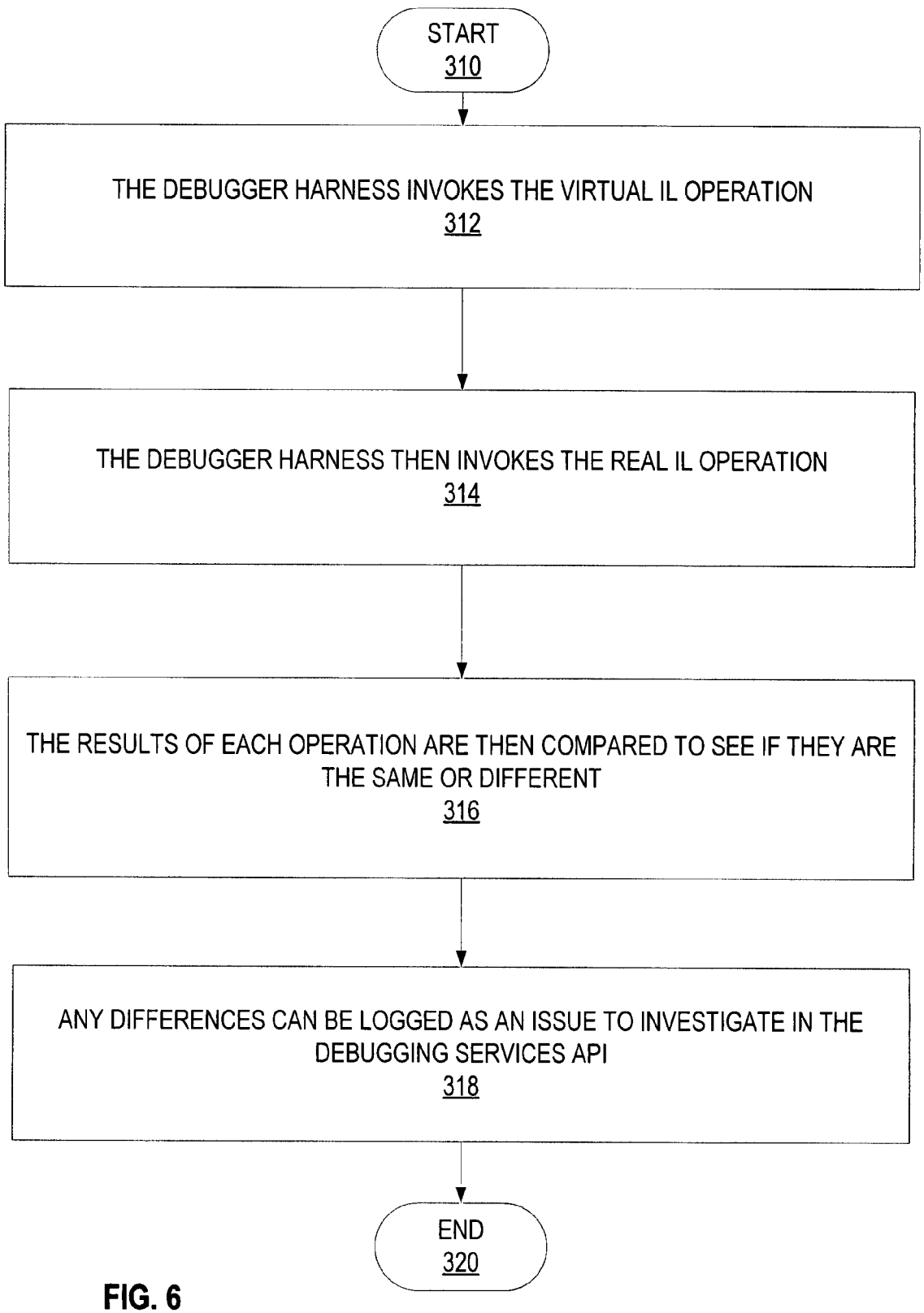
FIG. 6 is a process flow diagram for one implementation of the system of FIG. 1 illustrating the stages involved in providing self-checking instrumentation with the debugger harness.

FIG. 6 illustrates one implementation of the stages involved in providing self-checking instrumentation with the debugger harness. In one form, the process of FIG. 6 is at least partially implemented in the operating logic of computing device 100. The process begins at start point 310 with the debugger harness invoking the virtual IL operation (stage 312). The debugger harness then invokes the real IL operation (stage 314). The results of each operation are then compared to see if they are the same or different (stage 316). Any differences can be logged as an issue to investigate in the debugging services API (stage 318). The process ends at end point 320.

Figure 7:
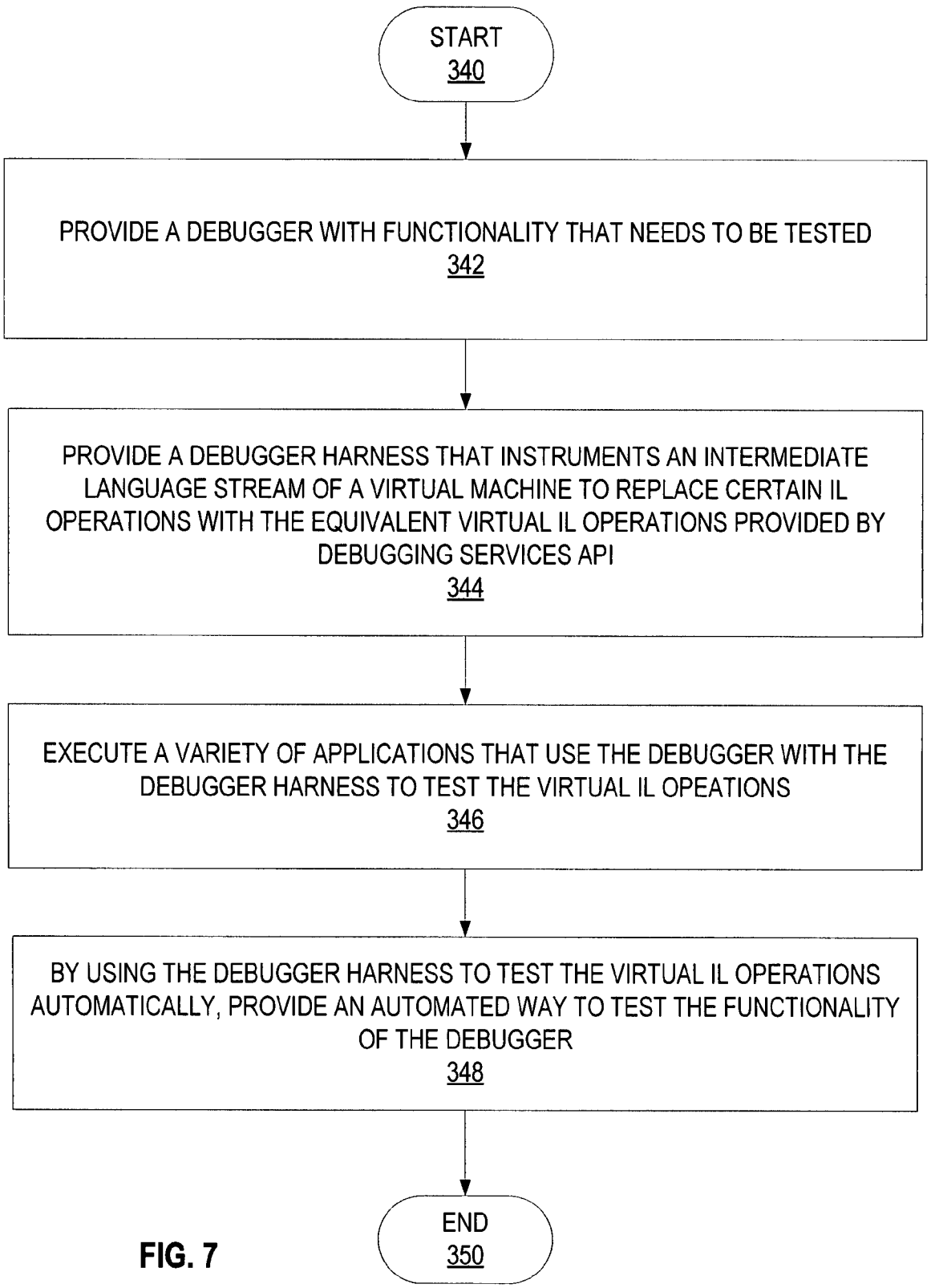
FIG. 7 is a process flow diagram for one implementation of the system of FIG. 1 that illustrates the stages involved in executing a variety of applications with the debugger harness to test the functionality of the debugger.

FIG. 7 illustrates one implementation of the stages involved in executing a variety of managed applications with the debugger harness to test the functionality of the debugger. In one form, the process of FIG. 7 is at least partially implemented in the operating logic of computing device 100. The process begins at start point 340 with providing a debugger with functionality that needs to be tested (stage 342). The system provides a debugger harness that instruments an intermediate language stream of a virtual machine to replace certain IL operations with the equivalent virtual IL operations provided by debugging services API (stage 344). A variety of managed applications are executed that use the debugger with the debugger harness to test the virtual IL operations (stage 346). By using the debugger harness to test the virtual IL operations automatically, an automated way to test the functionality of the debugger is provided (stage 348). The process ends at end point 350.

Figure 8:
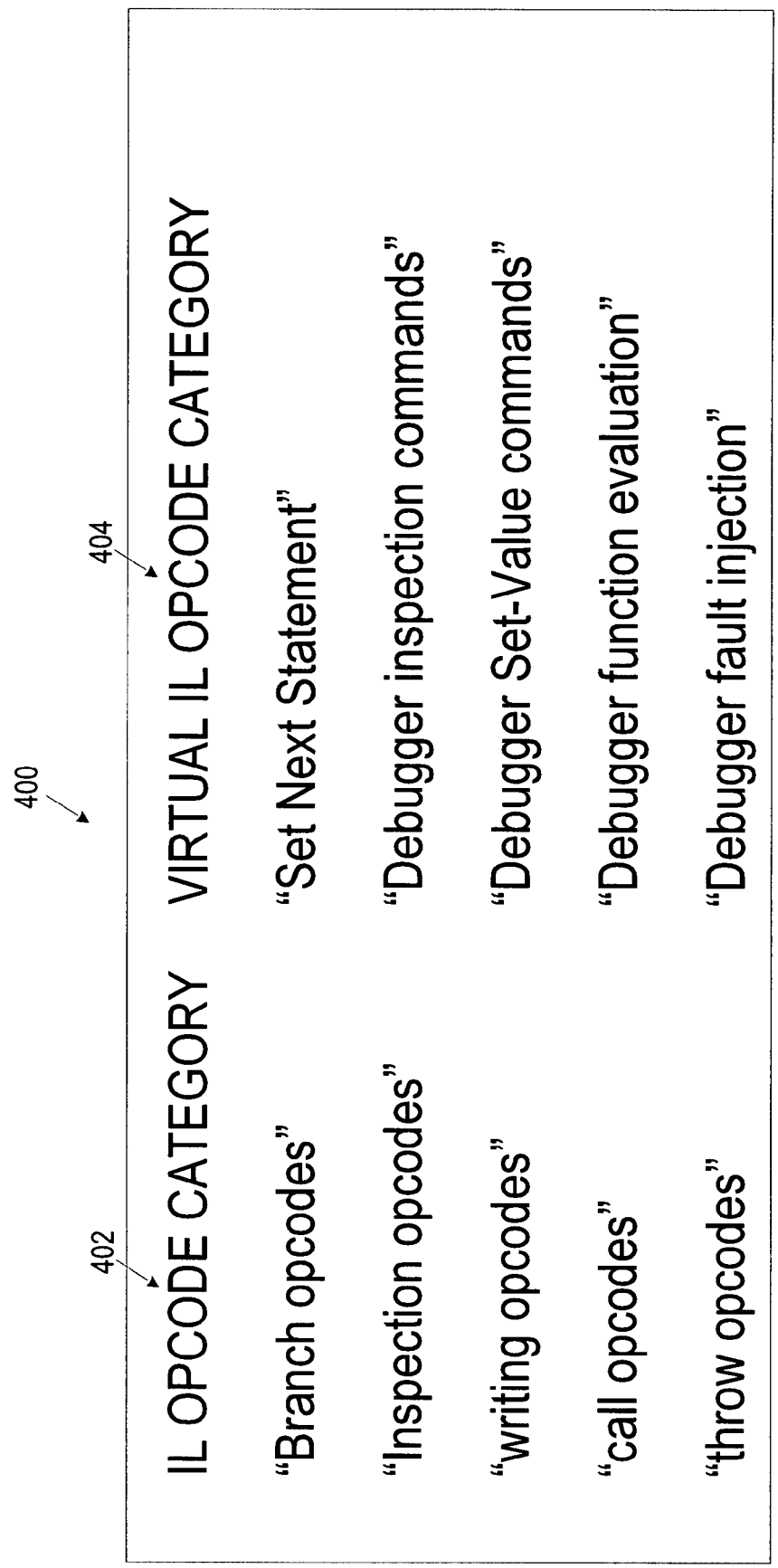
FIG. 8 is a diagram for one implementation that illustrates some exemplary intermediate language operations that can be replaced with virtual intermediate language operations.

FIG. 8 is a diagram 400 of one implementation that illustrates some exemplary categories (or types) of intermediate language operations 402 that can be replaced with certain categories (or types) of virtual intermediate language operations 404. In one implementation, almost all operations (e.g. opcodes) in the intermediate language can be instrumented, such as stack operations, catch blocks, branches, and so on. For example, branch opcodes can be instrumented with a set next statement. Inspection opcodes can be instrumented with debugger inspection commands. Writing opcodes can be instrumented with debugger Set-Value commands. Call opcodes can be instrumented with debugger function-evaluation. Throw opcodes can be instrumented with debugger fault injection. These are just a few examples, and numerous other types of operations could be used in addition to or instead of these examples.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A method for replacing an intermediate language operation with a virtual intermediate language operation comprising the steps of:
   providing a debugger harness that instruments an intermediate language stream to replace one or more intermediate language operations with an equivalent one or more virtual intermediate language operations, the debugger harness being used to test a functionality of a debugger;
   intercepting a particular intermediate language operation from the intermediate language stream and determining what particular virtual intermediate language operation of the one or more virtual intermediate language operations is equivalent; and
   replacing the particular intermediate language operation with the particular virtual intermediate language operation, said replacing comprising:
      popping one or more parameters of the particular virtual intermediate language operations off an intermediate language stack; and
      pushing a return value of the particular virtual intermediate language operation onto the intermediate language stack.

2. The method of claim 1, wherein a body of the particular virtual intermediate language operation can communicate with the debugger to determine the return value.

3. The method of claim 2, wherein the particular virtual intermediate language operation marshals between the intermediate language stack and the debugger.

4. The method of claim 1, wherein the replacing step is done with a function call to the particular virtual intermediate language operation.

5. The method of claim 1, wherein the one or more intermediate language operations are provided by a virtual machine for running managed applications.

6. The method of claim 1, wherein the one or more virtual intermediate language operations are implemented with cooperation from a debugging service application programming interface.

7. A computer-readable storage medium having computer-executable instructions for causing a computer to perform the steps recited in claim 1.

8. A computer-readable storage medium having computer-executable instructions for causing a computer to perform steps comprising:
   provide a debugger that is responsible for consuming debugging services, the debugging services having an application programming interface with virtual intermediate language operations;
   provide a debugger harness that instruments an intermediate language stream to replace one or more intermediate language operations with an equivalent one or more of the virtual intermediate language operations by popping one or more parameters of a particular virtual intermediate language operation off an intermediate language stack and pushing a return value of the particular virtual intermediate language operation onto the stack; and
   run the debugger with the debugger harness so that one or more managed applications are executed using the equivalent one or more of the virtual intermediate language operations, such that by running a program under the debugger harness, a functionality of the debugging services is tested.

9. The computer-readable storage medium of claim 8, wherein the functionality of the debugger is tested on one or more threads.

10. The computer-readable storage medium of claim 8, wherein a body of the particular virtual intermediate language operation can communicate with a debugger to determine the return value.

11. A method for testing a debugger using a debugger harness comprising the steps of:
   providing a debugger harness that instruments an intermediate language stream of a virtual machine to replace one or more intermediate language operations with an equivalent one or more virtual intermediate language operations provided by a debugging services application programming interface by popping one or more parameters of a particular virtual intermediate language operation off an intermediate language stack and pushing a return value of the particular virtual intermediate language operation onto the stack; and
   executing a plurality of applications that use the debugger with the debugger harness to test one or more virtual intermediate language operations to provide an automated way to test a functionality of the debugger.

12. The method of claim 11, wherein if a particular intermediate language operation does not have a particular equivalent virtual intermediate language operation, then running the particular intermediate language operation as normal.

13. The method of claim 1, wherein the debugger harness performs a selfchecking process that invoke the one or more intermediate language operations after invoking the one or more virtual intermediate language operations.

14. The method of claim 13, wherein any differences in results between an execution of a particular intermediate language operation and a particular virtual intermediate language operation are identified.

15. A computer-readable storage medium having computer-executable instructions for causing a computer to perform the steps recited in claim 11.

* * * * *